US012625543B2

(12) United States Patent　　　(10) Patent No.:　US 12,625,543 B2

Boatwright　　　　　　　　　　　　(45) Date of Patent:　May 12, 2026

(54) COMPUTER SYSTEM AND METHOD EMPLOYING ARTIFICIAL INTELLIGENCE ENGINE

(71) Applicant: Vance W. Boatwright, Hayward, CA (US)

(72) Inventor: Vance W. Boatwright, Hayward, CA (US)

(73) Assignee: SIMOLOGY CORP., Hayward, CA (US)

( * ) Notice:　Subject to any disclaimer, the term of this patent is extended or adjusted under 35 U.S.C. 154(b) by 0 days.

(21) Appl. No.: 18/900,334

(22) Filed:　Sep. 27, 2024

(65)　　　　　Prior Publication Data

US 2026/0093313 A1　　Apr. 2, 2026

(51) Int. Cl.
| | |
|---|---|
| *G06F 3/01* | (2006.01) |
| *G06T 7/246* | (2017.01) |
| *G06T 7/73* | (2017.01) |
| *G06T 15/00* | (2011.01) |
| *G10L 15/18* | (2013.01) |

(52) U.S. Cl.
CPC .............. *G06F 3/011* (2013.01); *G06F 3/017* (2013.01); *G06T 7/246* (2017.01); *G06T 7/73* (2017.01); *G06T 15/00* (2013.01); *G10L 15/1815* (2013.01); *G06T 2207/30196* (2013.01); *G06T 2210/21* (2013.01)

(58) Field of Classification Search
CPC .......... G06F 3/011; G06F 3/017; G06T 7/246; G06T 7/73; G06T 15/00; G06T 2207/30196; G06T 2210/21; G10L 15/1815
See application file for complete search history.

(56)　　　　　References Cited

U.S. PATENT DOCUMENTS

| | | | |
|---|---|---|---|
| 2023/0130770 A1* | 4/2023 | Miller | .................... G06N 20/00 345/156 |
| 2024/0144623 A1* | 5/2024 | Gori | .......................... G06T 7/70 |

* cited by examiner

*Primary Examiner* — Adam R. Giesy

(74) *Attorney, Agent, or Firm* — Trojan Law Offices, P.C.

(57)　　　　　ABSTRACT

A user enters natural language text into a mobile phone. The mobile phone detects features of the user. An artificial reality engine modifies features of the user based on an intent derived from the natural language.

25 Claims, 4 Drawing Sheets

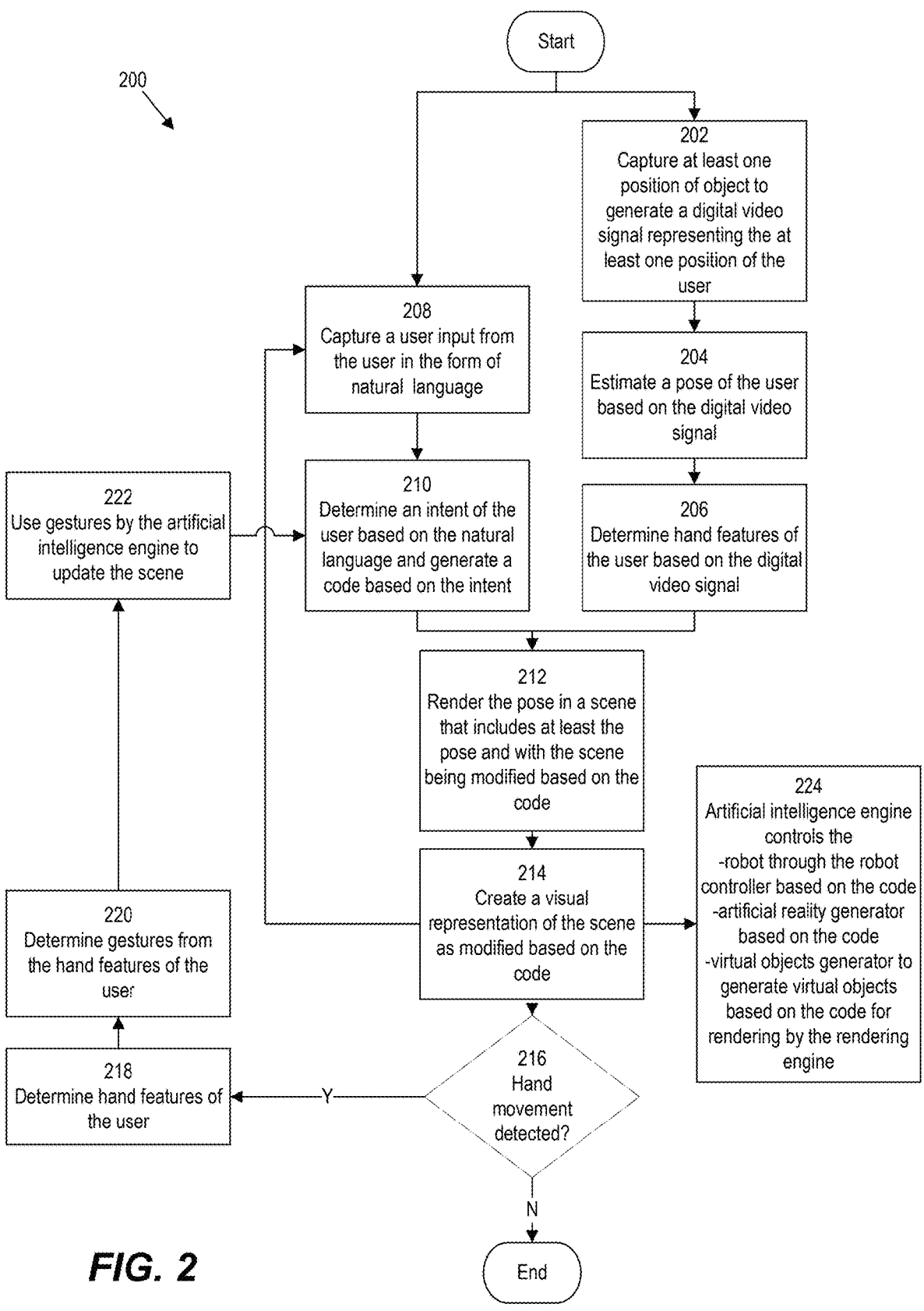

200

Start

202
Capture at least one position of object to generate a digital video signal representing the at least one position of the user 204
Estimate a pose of the user based on the digital video signal 206
Determine hand features of the user based on the digital video signal 208
Capture a user input from the user in the form of natural language 210
Determine an intent of the user based on the natural language and generate a code based on the intent 222
Use gestures by the artificial intelligence engine to update the scene 212
Render the pose in a scene that includes at least the pose and with the scene being modified based on the code 224
Artificial intelligence engine controls the
-robot through the robot controller based on the code
-artificial reality generator based on the code
-virtual objects generator to generate virtual objects based on the code for rendering by the rendering engine 214
Create a visual representation of the scene as modified based on the code 220
Determine gestures from the hand features of the user 218
Determine hand features of the user 216
Hand movement detected?

Y

N

End

*FIG. 2*

COMPUTER SYSTEM AND METHOD EMPLOYING ARTIFICIAL INTELLIGENCE ENGINE

BACKGROUND OF THE INVENTION

1). Field of the Invention

This invention relates to a computer system and a computer implemented method using an artificial intelligence engine.

2). Discussion of Related Art

Since their development in the 1940's digital computers have been programmed to carry out very complex tasks, such as discovering proofs for mathematical theorems or playing chess, with great proficiency. Despite continuing advances in computer processing speeds and memory capacity, there are as yet no programs that can match full human flexibility over wider domains or in tasks requiring much everyday knowledge. Some programs have attained the performance levels of human experts and professionals in executing certain specific task so that artificial intelligence, in this limited sense, is found in applications as diverse as medical diagnoses, computer search engines, voice, and handwriting recognition, and chatbots.

Further advances in artificial intelligence have given digital computers or computer-controlled robots the ability to perform tasks commonly associated with intelligent beings. The term "artificial intelligence" is frequently used for describing systems that appear to display the intellectual process characteristics of humans, such as the ability to reason, discover meaning, generalize, or learn from past experience.

SUMMARY OF THE INVENTION

The invention provides a computer system including a sensor positioned to capture at least one position of object to generate a digital signal representing the at least one position of the object, a pose estimator connected to the sensor and executable by at least one processor to estimate a pose of the object based on the digital signal, an input device positioned to a capture a user input from a user in the form of language, an artificial intelligence interface module connected to the input device and operable by the at least one processor to transmit the language to an artificial intelligence engine executable by the at least one processor to determine an intent of the user based on the language, and to generate code based on the intent, the artificial intelligence engine entering the intent in a rendering engine connected to the pose estimator and to the artificial intelligence engine and executable by the at least one processor to render the pose in a scene that includes at least the pose and with the scene being modified based on the generated code, a display, and a display module connected to the rendering engine to create a visual representation of the scene as modified based on the generated code for displaying by the display.

The computer system may further include that the object is at least one body part of the user.

The computer system may further include a mobile phone that may include a mobile phone body, and a camera mounted to the mobile phone body, wherein the sensor is a sensor of the camera.

The computer system may further include that the camera is an optical camera and the sensor is an optical sensor detecting light in the visible spectrum.

The computer system may further include that the input device is a keyboard.

The computer system may further include that the input device is a microphone, further including a speech-to-text interface module connected to the microphone and operable by the at least one processor to transmit speech captured by the microphone to a speech-to-text service executable by the at least one processor convert speech captured by the microphone to text, the text being the language used by the artificial intelligence engine.

The computer system may further include that the language is natural language.

The computer system may further include a body part tracker connected to the pose estimator and executable by at least one processor to determine body part features of the user.

The computer system may further include that the body part tracker determined gestures from the body part features of the user, the gestures being used by the artificial intelligence engine to update the scene.

The computer system may further include that the body part tracker is a hand tracker.

The computer system may further include a humanoid robot, and a robot controller connected to the robot and executable by the at least one processor, wherein the artificial intelligence engine controls the robot through the robot controller based on the generated code.

The computer system may further include an artificial reality generator connected to the artificial intelligence engine and executable by at least one processor, and a digital universe connected to the artificial reality generator and executable by the at least one processor, the artificial reality generator controlling the digital universe based on the generated code.

The computer system may further include a virtual objects generator connected to the artificial intelligence engine and executable by the at least one processor to generate virtual objects based on the generated code for rendering by the rendering engine.

The computer system may further include an object interaction module connected to the virtual objects generator and executable by the at least one processor to detect collisions of the virtual objects.

The invention also provides a computer system including a sensor positioned to capture at least one position of object to generate a digital signal representing the at least one position of the object, a pose estimator connected to the sensor and executable by at least one processor to estimate a pose of the object based on the digital signal, an input device positioned to a capture a user input from a user in the form of language, an artificial intelligence engine connected to the input device and operable by the at least one processor to determine an intent of the user based on the language, and to generate code based on the intent; a rendering engine connected to the pose estimator and to the artificial intelligence engine and executable by the at least one processor to render the pose in a scene that includes at least the pose and with the scene being modified based on the generated code, and a display connected to the rendering engine to create a visual representation of the scene as modified based on the generated code.

The invention further provides a computer-implemented method including capturing, with a sensor, at least one position of object to generate a digital signal representing the at least one position of the object, estimating, with a pose estimator connected to the sensor and executable by at least one processor, a pose of the object based on the digital signal, capturing, with an input device, a user input from a user in the form of language, determining, with an artificial intelligence engine connected to the input device and operable by the at least one processor, an intent of the user based on the language, the artificial intelligence engine generating a code based on the intent, rendering, with a rendering engine connected to the pose estimator and to the artificial intelligence engine and executable by the at least one processor, the pose in a scene that includes at least the pose and with the scene being modified based on the generated code, and creating, with a display connected to the rendering engine, a visual representation of the scene as modified based on the generated code.

The method may further include that the object is at least one body part of the user.

The method may further include that the sensor is a sensor of the camera.

The method may further include that the camera is an optical camera and the sensor is an optical sensor detecting light in the visible spectrum.

The method may further include that the input device is a keyboard.

The method may further include that the input device is a microphone, further including converting, with a speech-to-text service connected to the microphone and executable by at least one processor, speech captured by the microphone to text, the text being the language used by the artificial intelligence engine.

The method may further include that the language is natural language.

The method may further include determining, with a body part tracker connected to the sensor and executable by at least one processor, body part features of the user.

The method may further include that the body part tracker determines gestures from the body part features of the user, the gestures being used by the artificial intelligence engine to update the scene.

The method may further include that the body part tracker is a hand tracker.

The method may further include that the artificial intelligence engine controls a robot through a robot controller based on the generated code.

The method may further include that an artificial reality generator controls a digital universe based on the generated code.

The method may further include wherein an artificial reality generator controls a virtual objects generator to generate virtual objects based on the generated code for rendering by the rendering engine.

The method may further include detecting, with an object interaction module connected to the virtual objects generator and executable by at least one processor, collisions of the virtual objects.

The invention also provides a computer system including an input device positioned to a capture an input, and an artificial intelligence interface module connected to the input device and operable by at least one processor to transmit the input to an artificial intelligence engine executable by the at least one processor to determine an intent of the input, and to generate code based on the intent, the artificial intelligence engine entering the intent in an integrated system connected to the artificial intelligence engine and executable by the at least one processor, wherein the artificial intelligence engine controls the integrated system based on the generated code.

The computer system may further include a humanoid robot, wherein the integrated system is a robot controller connected to the robot and executable by the at least one processor, wherein the artificial intelligence engine controls the robot through the robot controller based on the generated code.

The computer system may further include a rendering engine connected to the artificial intelligence engine and executable by the at least one processor to render a scene based on the integrated system, a display, and a display module connected to the rendering engine to create a visual representation of the scene for displaying by the display.

The computer system may further include that the integrated system is an artificial reality generator connected to the artificial intelligence engine and executable by at least one processor, further including a digital universe connected to the artificial reality generator and executable by the at least one processor, the artificial reality generator controlling the digital universe based on the generated code.

The computer system may further include that the integrated system is a virtual objects generator connected to the artificial intelligence engine and executable by the at least one processor to generate virtual objects based on the generated code for rendering by the rendering engine.

The computer system may further include that the integrated system is an object interaction module connected to the virtual objects generator and executable by at least one processor to detect collisions of the virtual objects.

The invention further provides a computer system including an input device positioned to a capture an input, an artificial intelligence engine executable by the at least one processor to determine an intent of the input, and to generate code based on the intent, the artificial intelligence engine entering the intent, and an integrated system connected to the artificial intelligence engine and executable by the at least one processor, wherein the artificial intelligence engine controls the integrated system based on the generated code.

The invention also provides a computer-implemented method including capturing, with an input device, an input, determining, with an artificial intelligence engine connected to the input device and operable by the at least one processor, an intent based on the intent, the artificial intelligence engine generating a generated code based on the intent, and controlling, with the artificial intelligence engine, an integrated system connected to the artificial intelligence engine and executable by the at least one processor, wherein the artificial intelligence engine controls the integrated system based on the generated code.

The computer-implemented method may further include that the integrated system is a robot controller connected to a robot and executable by the at least one processor, wherein the artificial intelligence engine controls the robot through the robot controller based on the generated code.

The computer-implemented method may further include rendering, with a rendering engine connected to the artificial intelligence engine and executable by the at least one processor, a scene based on the integrated system, and creating, with a display connected to the rendering engine, a visual representation of the scene.

The computer-implemented method may further include that the integrated system is an artificial reality generator connected to the artificial intelligence engine and executable by the at least one processor, the artificial reality generator controlling the digital universe based on the generated code.

The computer-implemented method may further include that the integrated system is a virtual objects generator connected to the artificial intelligence engine and executable by the at least one processor to generate virtual objects based on the generated code for rendering by the rendering engine.

The computer-implemented method may further include that the integrated system is an object interaction module connected to the virtual objects generator and executable by at least one processor to detect collisions of the virtual objects.

BRIEF DESCRIPTION OF THE DRAWINGS

The invention is further described by way of example with reference to the accompanying drawings, wherein:

FIG. 2 is a flow chart of a computer implemented method according to an embodiment of the invention;

DETAILED DESCRIPTION OF THE INVENTION

Figure 1:
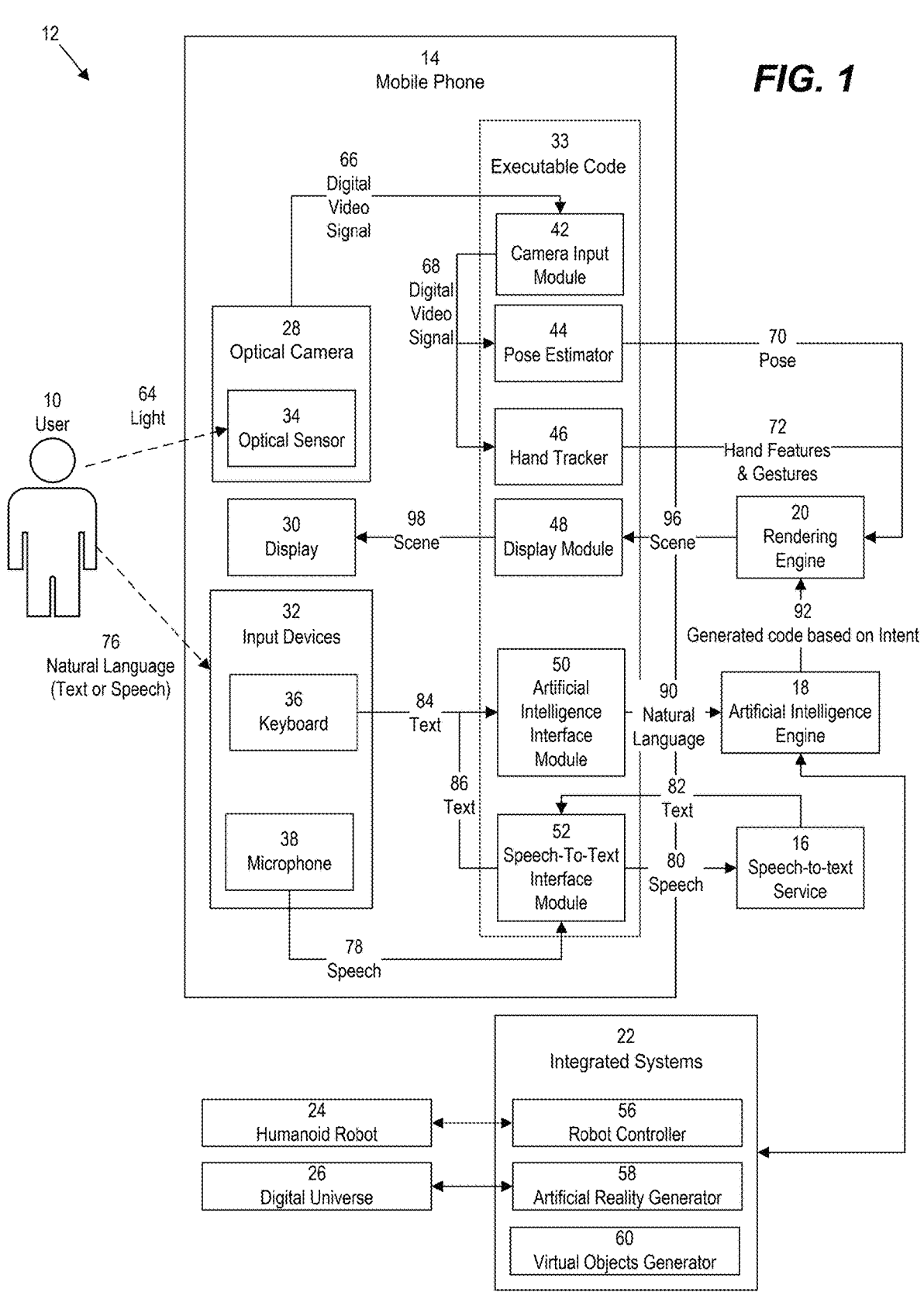
FIG. 1 is a block diagram of a computer system according to an embodiment of the invention.

FIG. 1 of the accompanying drawings illustrates a user 10 and a computer system 12, according to an embodiment of the invention, including a mobile phone 14, a speech-to-text service 16, an artificial intelligence engine 18, a rendering engine 20, integrated systems 22, a humanoid robot 24, and a digital universe 26. The mobile phone 14 is connected over the Internet to the speech-to-text service 16, the artificial intelligence engine 18, the rendering engine 20, and the integrated systems 22. The integrated systems 22 are connected to the humanoid robot 24 and to the digital universe 26.

The mobile phone 14 includes a mobile phone body (not shown), and mounted to the mobile phone body, a storage device such as memory (not shown), a processor (not shown), an optical camera 28, a display 30, and input devices 32. An executable code 33 is stored on the storage device. The processor can read and execute the executable code 33.

The optical camera 28 includes an optical sensor 34. The optical sensor 34 is capable of detecting light within the visible spectrum while one or more lenses are mounted in front of the optical sensor 34 for purposes of focusing incoming light on the optical sensor 34. The optical sensor 34 has the ability to capture several frames of light and convert the frames into a digital video signal using known methods.

The display 30 may be a two-dimensional display such as some found on a mobile phone.

The input devices 32 include a keyboard 36 and a microphone 38. The keyboard 36 may be a touchscreen keyboard that is displayed on the display 30 or may be a physical keyboard. The keyboard 36 may be an alphanumeric keyboard that a user 10 may use to enter text.

The microphone 38 is mounted in a position to capture sounds near the mobile phone 14 and will be used to capture voice acoustics from the user 10. The optical camera 28, display 30, and input devices 32 each have their respective associated control modules (not shown) that are stored on the executable code 33 so that the processor may control their individual functionalities. A bus typically connects the storage device, optical camera 28, display 30, and input devices 32 to one another.

The executable code 33 further includes a camera input module 42, a pose estimator 44, a hand tracker 46, a display module 48, an artificial intelligence interface module 50, and a speech-to-text interface module 52. The camera input module 42 is connected to the optical camera 28. The pose estimator 44 and hand tracker 46 are connected to the camera input module 42. The rendering engine 20 is connected over the Internet to the pose estimator 44 and the hand tracker 46. The display module 48 is connected to the rendering engine 20. The display 30 is connected to the display module 48.

The artificial intelligence interface module 50 is connected to the input devices 32. The artificial intelligence engine 18 is connected to the artificial intelligence interface module 50. The rendering engine 20 is connected to the artificial intelligence engine 18 (in addition to being connected to the pose estimator 44 and the hand tracker 46).

The speech-to-text interface module 52 is connected to the microphone 38 and to the speech-to-text service 16.

The integrated systems 22 include a robot controller 56, an artificial reality generator 58, a virtual objects generator 60. The artificial intelligence engine 18 and the integrated systems 22 are connected to one another for bi-directional communication. The robot controller 56 is connected to the humanoid robot 24. The artificial reality generator 58 is connected to the digital universe 26.

The functioning of the computer system 12 in FIG. 1 will now be described with the assistance of FIG. 2 that shows a computer implemented method 200 according to an embodiment of the invention.

At step 202, at least one position of an object is captured to generate a digital video signal representing the at least one position of the user 10 in FIG. 1. In FIG. 1, at 64, light reflecting from the user 10 falls on the optical sensor 34. The optical sensor 34 then generates a digital video signal. At 66, the optical camera 28 transmits the digital video signal to the camera input module 42. The camera input module 42 captures real-time video input of the user 10 and objects surrounding the user 10 in the environment, and the digital video signal represents the captured video input.

At step 204, a pose of the user 10 is estimated based on the digital video signal. In FIG. 1, the camera input module 42, at 68, enters the digital video signal into the pose estimator 44. The pose estimator 44 receives the digital video signal from the camera input module 42 and analyzes individual frames of the digital video signal to identify key body landmarks of the user 10. The pose estimator 44 then creates a skeletal representation of the body of the user 10 based on the identified key body landmarks and estimates a three-dimensional body pose of the user 10 based on the skeletal representation.

At step 206, hand features of the user 10 are determined based on the digital video signal. In FIG. 1, at 68, the camera input module 42 enters the digital video signal into the hand tracker 46. The hand tracker 46 receives the digital video signal from the camera input module 42. The hand tracker 46 detects and tracks the precise positions of a plurality of three-dimensional landmarks on each hand of the user 10.

At step 70, the pose estimator 44 provides the three-dimensional body pose to the artificial intelligence engine 18 in FIG. 1 and, at step 72, the hand tracker 46 provides the hand features to the artificial intelligence engine 18. The artificial intelligence engine 18 is now in possession of all three-dimensional features of the body and hands of the user 10.

At step 208, a user input is captured from the user 10 in FIG. 1 in the form of natural language. In FIG. 1, at 76, the user 10 enters natural language into mobile phone 14 using one of the input devices 32. The natural language may, for example, be in the form of text that the user 10 enters using the keyboard 36.

Alternatively, the user 10 may enter natural language at 76 using speech via the microphone 38. The microphone 38 converts audible waves into digital speech. At 78, the microphone 38 transmits the speech-to-text interface module 52. At 80, the speech-to-text interface module 52 transmits the speech to the speech-to-text service 16. The speech-to-text service 16 converts the speech into text and transmits the text to the speech-to-text interface module at 82.

The artificial intelligence interface module 50 receives text from the keyboard 36 or the speech-to-text interface module 52 at 84 or 86, respectively, depending on whether the user 10 used the keyboard 36 or the microphone 38. At 90, the artificial intelligence interface module 50 provides the text as natural language to the artificial intelligence engine 18. The artificial intelligence engine 18 receives the natural language input from the artificial intelligence interface module 50 and processes the natural language using natural language understanding techniques to extract semantic meaning of intent from the input.

At step 210, an intent of the user 10 is based on the natural language and a code is generated based on the intent. In FIG. 1, the artificial intelligence engine 18 analyzes the received data using a combination of rule-based algorithms and machine learning models to determine user intent and desired actions within a virtual or augmented reality environment. The artificial intelligence engine 18 then generates a code based on the determined user intent and desired actions. The generated code is designed to modify or interact with elements in the virtual or augmented reality environment. At 92, the artificial intelligence engine 18 enters the generated code based on the intent into the rendering engine 20.

At step 212, the rendering engine 20 renders the pose in a scene that includes at least the pose and with the scene being modified by the generated code. In FIG. 1, the rendering engine 20 receives the generated code from the artificial intelligence engine 18 and executes the received generated code to create or update a three-dimensional virtual environment. The body pose and hand positions of the user 10 are rendered within the virtual environment based on data received from the pose estimator 44 and the hand tracker 46.

At step 214, a visual representation of the scene as modified based on the generated code is created. In FIG. 1, the rendering engine, at 96, transmits the scene to the display module 48. The display module 48, at 98, uses the display 30 to project the scene for viewing by the user 10. The display module 48 optimizes the scene for the specific display hardware being used, which may include adjusting for factors such as resolution, refresh rate, and field-of-view.

At step 208, further input is received from the user 10 in FIG. 1 in the form of natural language. The process at steps 210, 212, and 214 may then be repeated in continuous loop wherein the scene is continuously modified by natural language input from the user 10 in FIG. 1.

At step 216, a determination is made whether hand movement of the user 10 in FIG. 1 is detected. At 218, hand features of the user are detected. In FIG. 1, the hand tracker 46, in addition to detecting and tracking precise positions of a plurality of three-dimensional landmarks on each hand of the user 10, as described above, also analyzes the tracked landmark positions to recognize predefined hand gestures. The hand tracker 46 then outputs hand gesture data representing the recognized hand gestures. The artificial intelligence engine 18 receives the hand gestures from the hand tracker 46. The artificial intelligence engine 18 is a multi-modal artificial intelligence engine 18 having the ability to integrate inputs such as natural language, vision, and potentially other sensory inputs. In FIG. 2, after the hand gestures of the user 10 in FIG. 1 have been determined at step 218, and the hand gestures are determined at step 220 by the artificial intelligence engine 18 in FIG. 1, the artificial intelligence engine 18, at step 222, uses the hand gestures to update the scene. At step 210, the intent of the user 10 is determined not only using the natural language input from the user 10 but also the gestures. The cycle represented at steps 210, 212, 214, 216, 218. 220, and 222 may be repeated in a continuous loop.

At step 224, following step 214, the artificial intelligence engine 18 in FIG. 1 may further control one or more of the humanoid robot 24 through the robot controller 56 based on the generated code, the artificial reality generator 58 based on the generated code, and the virtual objects generator 60 to generate virtual objects based on the generated code for rendering by the rendering engine 20. The robot controller 56 receives estimated body pose data from the pose estimator 40, and hand gestures from the hand tracker 46 via the artificial intelligence engine 18. The robot controller 56 translates the received body pose and hand gesture data into standardized control commands for the humanoid robot 24. The robot controller 56 then transmits the translated control commands to the humanoid robot 24 in real-time and receives process feedback from the humanoid robot 24 regarding the execution of commands.

The artificial reality generator 58 uses the pose and hand gestures to enter into and modify the digital universe 26.

The virtual objects generator 60 receives input from the artificial intelligence engine 18 based on the natural language received by the artificial intelligence engine 18 and/or the gestures received from the hand tracker 46 by the artificial intelligence engine 18 to create virtual objects to be part of the scene. The user 10 may then interact with the virtual objects within the scene using natural language interpretation of intent as described above. The executable code 33 on the mobile phone 14 may include an object interaction module that calculates for collision detection and performance physics simulation of the virtual objects and how they relate to the rendered pose of the user 10.

The executable code 33 may further include a module for integration of virtual currency or simulated currency. Such a module integrates with a remote marketplace and both the marketplace and the virtual currency can be displayed by the rendering engine 20. The marketplace will not however be controlled by the artificial intelligence engine 18.

Separate blocks may be allocated within the storage of the mobile phone 14 and within the artificial intelligence engine 18 for data collection. The data collection can be used to further refine the functioning of the computer system 12.

Figure 3:
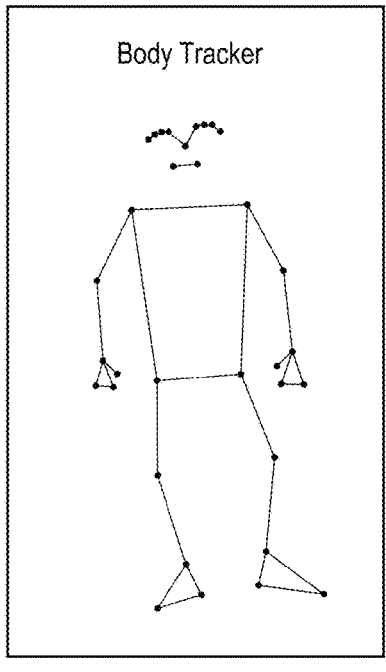
FIG. 3 is a screenshot of a body pose of a user.

FIG. 3 illustrates a rendering that is shown on the display 30 in FIG. 1 when the pose estimator 44 in FIG. 1 has completed the pose estimation in step 204 in FIG. 2. The skeletal representation of the body of the user 10 including identified key body landmarks are shown on the display 30.

Figure 4:
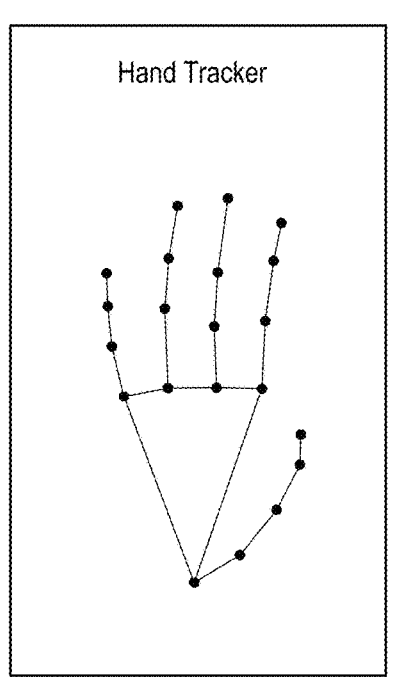
FIG. 4 is a screenshot of hand features of a user.

FIG. 4 shows the functioning of the hand tracker 46 in FIG. 1 after hand features of the user 10 are determined at step 206 in FIG. 2.

Figure 5:
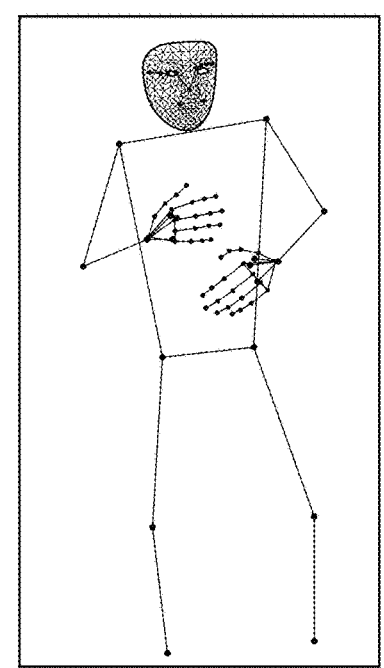
FIG. 5 is a screenshot of a body pose, facial features, and hand features of the user.

FIG. 5 illustrates a rendering of the user 10 after all facial, body and all hand features have been detected and calculated.

Figure 6:
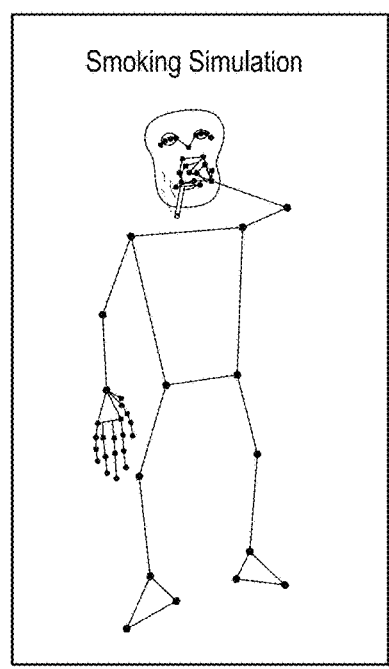
FIG. 6 is a screenshot of a smoking simulation of the user.

FIG. 6 illustrates a visualization on the display 30 with a simulation of the user 10 smoking a cigarette. The cigarette is created by the virtual objects generator 60 in FIG. 1, at step 224 in FIG. 2. The user 10 may, for example, enter natural language stating, "Smoke a cigarette". The artificial intelligence engine 18 interprets the natural language and generates the cigarette using the virtual objects generator 60. The artificial intelligence engine 18 then places the cigarette within a hand of the user 10 and moves the hand of the user 10 to a face of the user 10 in the simulation. With the cigarette touching the lips of the user 10 in the simulation, the simulation represents the user inhaling from the cigarette. What should be noted is that there is no cigarette in the real world and the user does not bring their hand to their face in the real world. In the real world, the user 10 may still be in a position as shown in FIG. 5 wherein their hands are away from their face. Alternatively, in the real world, the user 10 may use one hand to hold the mobile phone 14 in FIG. 1 and use the other hand to enter natural language text on the keyboard 36.

Figure 7:
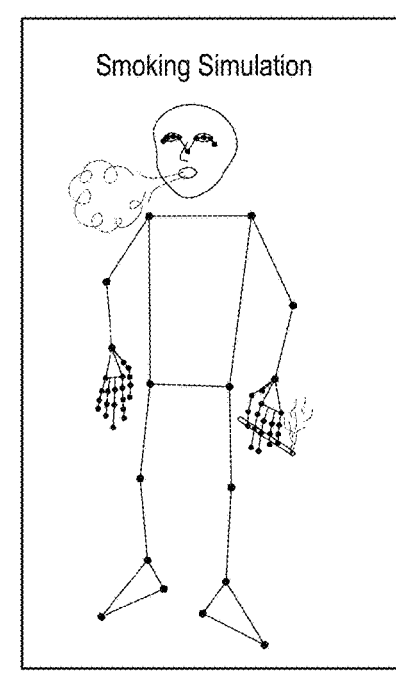
FIG. 7 is another screenshot of the smoking simulation.

In FIG. 7, the user 10 is shown to be exhaling smoke while the hand holding the cigarette has moved away from their face. The artificial intelligence engine 18 in FIG. 1 continues to respond to the original intent to smoke a cigarette by transitioning from the representation in FIG. 6 to the representation in FIG. 7.

It can be seen from the above description that the physical features of the user 10 in FIG. 1 are entered into the artificial intelligence engine 18 as shown in FIG. 5, and that the features of the user 10 are then uncoupled from their physical real world features on FIGS. 6 and 7. By uncoupling the simulated features of the user 10 from the real world features, the user 10 is now allowed to interact with virtual objects such as the cigarette in a simulation. The user 10 is also permitted to interact with the digital universe 26 in FIG. 1. The user 10 may also change their physical appearance to control the robot controller 56 and the humanoid robot 24 in FIG. 1. The humanoid robot 24 may, for example, copy the movements of the user in the simulation.

Although the invention has been described with reference to a two-dimensional display 30, it should be understood that visual representations may be projected using other systems. For example, the user 10 may use a headset for three-dimensional virtual reality viewing, a virtual reality that is perceived by the user may include the digital universe 26 in a three-dimensional space.

In the given example, the hand tracker 46, at 72, transmits hand features and hand gestures to the artificial intelligence engine 18. It should, however, be understood that other gestures may be recognized by the artificial intelligence engine 18, for example, the movement of a limb such as a leg. Hand or body part features may also be modified by the user or may be modified in a learning cycle by the artificial intelligence engine 18.

It will be understood that a computer system that includes a computer other than a mobile phone may be used. For example, a laptop or desktop computer may be used instead of the mobile phone 14 in FIG. 1 and that such a laptop or desktop computer may have its own or added optical camera.

The optical sensor 34 in FIG. 1 is conveniently located on the mobile phone 14 to capture body, hand, and facial features of the user 10. However, other sensors may be used for capturing such features of a user, such as electromagnetic interaction systems, Doppler radar, LiDAR, etc. An optical microscope has lenses in front of a sensor that allows for detecting objects that are tiny, such as body parts of bugs. Electron microscopes may detect features that are only a few nanometers wide. A telescope has lenses that allow capturing images or video of far-away features.

As should be evident from the above description, an advantage of the invention is that the features and proportions of the user 10 in FIG. 1 can be rendered on the display 30 and be modified using a natural language and that the intent of the natural language is determined by the artificial intelligence engine 18. As an extension, the integrated systems 22 can also be controlled using the natural language input from the user 10.

A further advantage is that the integrated systems 22 are controlled by the artificial intelligence engine 18. In another embodiment, it may, for example, be possible for the artificial intelligence engine 18 to control the integrated systems 18 without any natural language input. For example, the artificial intelligence engine 18 may receive the hand features and gestures at 72 and then use the gestures to determine an intent of the user 10 to generate a code that is used to control the robot controller 56 and the humanoid robot 24. In such an example, a user may control the humanoid robot 24 through the artificial intelligence engine 18 without providing a natural language input through the input devices 32. In a similar manner, the artificial intelligence engine 18 may use the gestures to determine an intent for controlling a generated code that then is used to control the artificial reality generator 58 or the virtual objects generator 60 without any natural language input into the artificial intelligence engine 18.

It may also be possible for the artificial intelligence engine 18 to receive an input, from which an intent is generated, from a source other than the user 10. Such other sources of information on which the artificial intelligence engine 18 can rely are extensive. For example, the artificial intelligence engine 18 may receive an input from an annual calendar. On a particular day, for example July 4, which is Independence Day in the United States of America, the artificial intelligence engine 18 may generate a code that has the robot controller 56 control the humanoid robot 24 in a manner that is consistent with Independence Day, for example by making preparation for Independence Day festivities. The humanoid robot 24 is thus controlled without any input from the user 10. The artificial intelligence engine 18 may also receive input from another artificial intelligence engine.

Although body parts of a human are detected in the example described above, it may also be possible to detect other objects. Of particular importance is the detection of animals and parts of their bodies. Once in the simulation, the simulated features of the animal may be controlled with language input from the animal, for example a dog barking.

Figure 8:
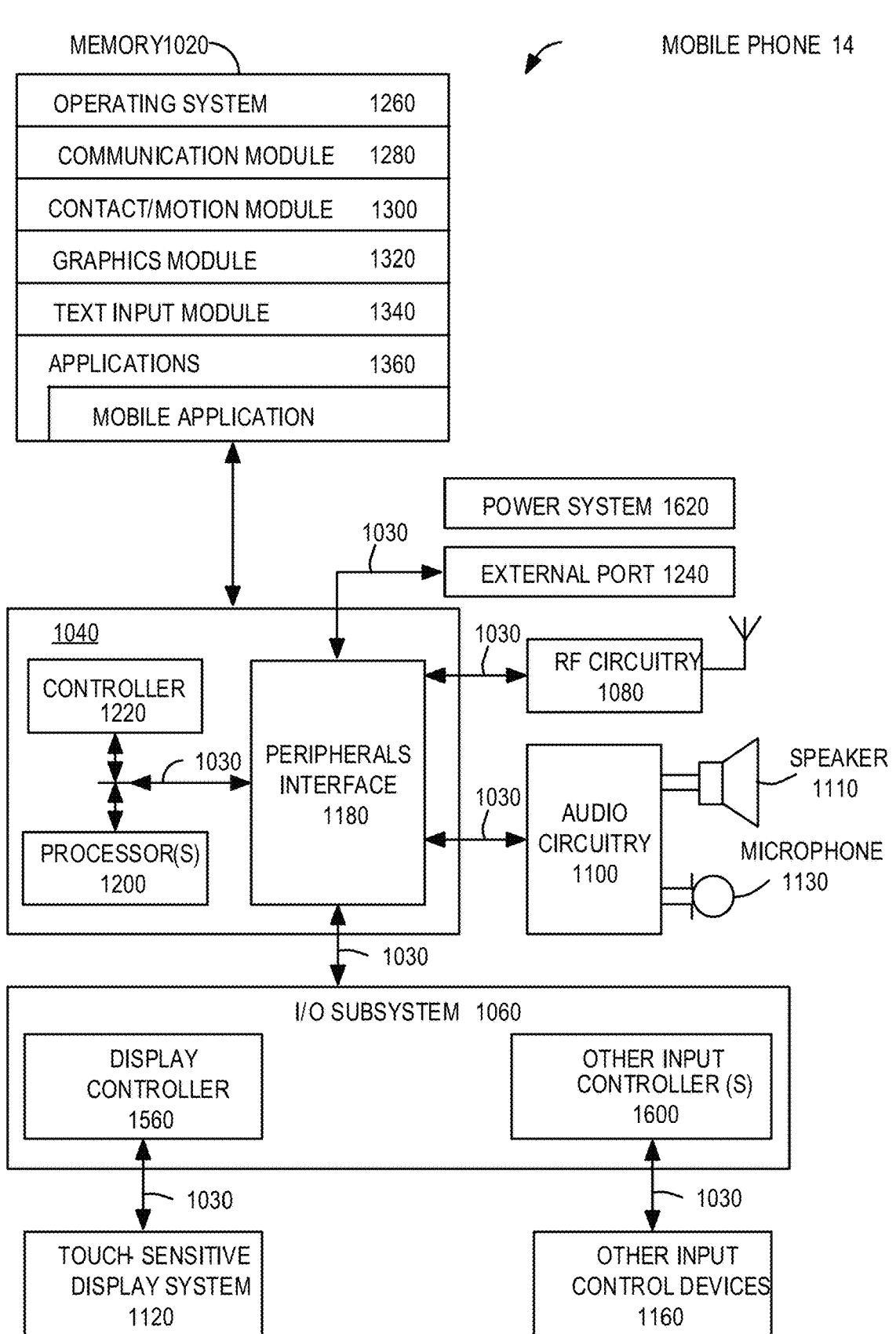
FIG. 8 is a block diagram of the mobile phone illustrating SmartPhone features thereof.

FIG. 8 is a block diagram illustrating the mobile phone 14, illustrating a touch-sensitive display 1120 or a "touchscreen" for convenience. The mobile phone 14 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 8 may be implemented in hardware, software or a combination of hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the mobile phone 14, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the mobile phone 14 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the mobile phone 14. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the mobile phone 14, such as the touchscreen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touchscreen 1120 or begin a process that uses gestures on the touchscreen to unlock the device. A longer press of the push button may turn power to the mobile phone 14 on or off. The touchscreen 1120 is used to implement virtual or soft buttons and one or more soft keyboards.

The touch-sensitive touchscreen 1120 provides an input interface and an output interface between the device and a user. The display controller 1560 receives and/or sends electrical signals from/to the touchscreen 1120. The touchscreen 1120 displays visual output to the user. The visual output may include graphics, text, icons, video, and any combination thereof (collectively termed "graphics"). In some embodiments, some or all of the visual output may correspond to user-interface objects, further details of which are described below.

A touchscreen 1120 has a touch-sensitive surface, sensor or set of sensors that accepts input from the user based on haptic and/or tactile contact. The touchscreen 1120 and the display controller 1560 (along with any associated modules and/or sets of instructions in memory 1020) detect contact (and any movement or breaking of the contact) on the touchscreen 1120 and converts the detected contact into interaction with user-interface objects (e.g., one or more soft keys, icons, web pages or images) that are displayed on the touchscreen. In an exemplary embodiment, a point of contact between a touchscreen 1120 and the user corresponds to a finger of the user.

The touchscreen 1120 may use LCD (liquid crystal display) technology, or LPD (light emitting polymer display) technology, although other display technologies may be used in other embodiments. The touchscreen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touchscreen 1120.

The user may make contact with the touchscreen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touchscreen. In some embodiments, the device translates the rough finger-based input into a precise pointer/cursor position or command for performing the actions desired by the user.

The mobile phone 14 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., iOS, Android or Windows) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), LIGHTNING, etc.) is adapted for coupling directly to other devices or indirectly over a network (e.g., the Internet, wireless LAN, etc.).

The contact/motion module 1300 may detect contact with the touchscreen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touchscreen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touchscreen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input).

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer system comprising:
   a sensor positioned to capture at least one position of object to generate a digital signal representing the at least one position of the object;
   a pose estimator connected to the sensor and executable by at least one processor to estimate a pose of the object based on the digital signal;

14 an input device positioned to a capture a user input from a user in the form of language;
   an artificial intelligence interface module connected to the input device and operable by the at least one processor to transmit the language to an artificial intelligence engine executable by the at least one processor to determine an intent of the user based on the language, and to generate code based on the intent, the artificial intelligence engine entering the intent in a rendering engine connected to the pose estimator and to the artificial intelligence engine and executable by the at least one processor to render the pose in a scene that includes at least the pose and with the scene being modified based on the generated code;
   a display;
   a display module connected to the rendering engine to create a visual representation of the scene as modified based on the generated code for displaying by the display;
   a humanoid robot; and
   a robot controller connected to the robot and executable by the at least one processor, wherein the artificial intelligence engine controls the robot through the robot controller based on the generated code.

2. The computer system of claim 1, wherein the object is at least one body part of the user.

3. The computer system of claim 1, further comprising:
   a mobile phone that includes:
   mobile phone body; and
   a camera mounted to the mobile phone body, wherein the sensor is a sensor of the camera.

4. The computer system of claim 3, wherein the camera is an optical camera and the sensor is an optical sensor detecting light in the visible spectrum.

5. The computer system of claim 1, wherein the input device is a keyboard.

6. The computer system of claim 1, wherein the input device is a microphone, further comprising:
   a speech-to-text interface module connected to the microphone and operable by the at least one processor to transmit speech captured by the microphone to a speech-to-text service executable by the at least one processor convert speech captured by the microphone to text, the text being the language used by the artificial intelligence engine.

7. The computer system of claim 1, wherein the language is natural language.

8. The computer system of claim 1, further comprising:
   a body part tracker connected to the pose estimator and executable by at least one processor to determine body part features of the user.

9. The computer system of claim 8, wherein the body part tracker determined gestures from the body part features of the user, the gestures being used by the artificial intelligence engine to update the scene.

10. The computer system of claim 8, wherein the body part tracker is a hand tracker.

11. The computer system of claim 1, further comprising:
   an artificial reality generator connected to the artificial intelligence engine and executable by the at least one processor; and
   a digital universe connected to the artificial reality generator and executable by the at least one processor, the artificial reality generator controlling the digital universe based on the generated code.

12. The computer system of claim 1, further comprising:

a virtual objects generator connected to the artificial intelligence engine and executable by the at least one processor to generate virtual objects based on the generated code for rendering by the rendering engine.

13. The computer system of claim 12, further comprising:

an object interaction module connected to the virtual objects generator and executable by the at least one processor to detect collisions of the virtual objects.

14. A computer-implemented method comprising:

capturing, with a sensor, at least one position of object to generate a digital signal representing the at least one position of the object;

estimating, with a pose estimator connected to the sensor and executable by at least one processor, a pose of the object based on the digital signal;

capturing, with an input device, a user input from a user in the form of language;

determining, with an artificial intelligence engine connected to the input device and operable by the at least one processor, an intent of the user based on the language, the artificial intelligence engine generating a code based on the intent;

rendering, with a rendering engine connected to the pose estimator and to the artificial intelligence engine and executable by the at least one processor, the pose in a scene that includes at least the pose and with the scene being modified based on the generated code;

creating, with a display connected to the rendering engine, a visual representation of the scene as modified based on the generated code; and determining, with a body part tracker connected to the sensor and executable by at least one processor, body part features of the user;

wherein the body part tracker determines gestures from the body part features of the user, the gestures being used by the artificial intelligence engine to update the scene.

15. The method of claim 14, wherein the object is at least one body part of the user.

16. The method of claim 14, wherein the sensor is a sensor of the camera.

17. The method of claim 16, wherein the camera is an optical camera and the sensor is an optical sensor detecting light in the visible spectrum.

18. The method of claim 14, wherein the input device is a keyboard.

19. The method of claim 14, wherein the input device is a microphone, further comprising:

converting, with a speech-to-text service connected to the microphone and executable by at least one processor, speech captured by the microphone to text, the text being the language used by the artificial intelligence engine.

20. The method of claim 14, wherein the language is natural language.

21. The method of claim 14, wherein the body part tracker is a hand tracker.

22. A computer-implemented method comprising:

capturing, with a sensor, at least one position of object to generate a digital signal representing the at least one position of the object;

estimating, with a pose estimator connected to the sensor and executable by at least one processor, a pose of the object based on the digital signal;

capturing, with an input device, a user input from a user in the form of language;

determining, with an artificial intelligence engine connected to the input device and operable by the at least one processor, an intent of the user based on the language, the artificial intelligence engine generating a code based on the intent;

rendering, with a rendering engine connected to the pose estimator and to the artificial intelligence engine and executable by the at least one processor, the pose in a scene that includes at least the pose and with the scene being modified based on the generated code;

creating, with a display connected to the rendering engine, a visual representation of the scene as modified based on the generated code;

wherein the artificial intelligence engine controls a robot through a robot controller based on the generated code.

23. The method of claim 22, wherein an artificial reality generator controls a digital universe based on the generated code.

24. The method of claim 22, further comprising:

wherein an artificial reality generator controls a virtual objects generator to generate virtual objects based on the generated code for rendering by the rendering engine.

25. A computer implemented method comprising:

capturing, with a sensor, at least one position of object to generate a digital signal representing the at least one position of the object;

estimating, with a pose estimator connected to the sensor and executable by at least one processor, a pose of the object based on the digital signal;

capturing, with an input device, a user input from a user in the form of language;

determining, with an artificial intelligence engine connected to the input device and operable by the at least one processor, an intent of the user based on the language, the artificial intelligence engine generating a code based on the intent;

rendering, with a rendering engine connected to the pose estimator and to the artificial intelligence engine and executable by the at least one processor, the pose in a scene that includes at least the pose and with the scene being modified based on the generated code;

creating, with a display connected to the rendering engine, a visual representation of the scene as modified based on the generated code;

controlling, by an artificial reality generator, a virtual objects generator to generate virtual objects based on the generated code for rendering by the rendering engine; and detecting, with an object interaction module connected to the virtual objects generator and executable by the at least one processor, collisions of the virtual objects.

* * * * *